US012676673B2

(12) United States Patent
Cho et al.

(10) Patent No.: US 12,676,673 B2
(45) Date of Patent: Jul. 7, 2026

(54) RADIO ACCESS NETWORK (RAN) EQUIPMENT AND COMMUNICATION EQUIPMENT FOR PERFORMING PHOTONICS-BASED TERAHERTZ WIRELESS COMMUNICATION

(71) Applicant: ELECTRONICS AND TELECOMMUNICATIONS RESEARCH INSTITUTE, Daejeon (KR)

(72) Inventors: Seung-Hyun Cho, Sejong-si (KR); Joon Ki Lee, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 315 days.

(21) Appl. No.: 18/515,598

(22) Filed: Nov. 21, 2023

(65) Prior Publication Data

US 2024/0178916 A1 May 30, 2024

(30) Foreign Application Priority Data

Nov. 24, 2022 (KR) ........................ 10-2022-0159334

(51) Int. Cl.
*H04B 10/112* (2013.01)
*H04B 10/03* (2013.01)

(52) U.S. Cl.
CPC ........... *H04B 10/112* (2013.01); *H04B 10/03* (2013.01)

(58) Field of Classification Search
None
See application file for complete search history.

(56) References Cited

U.S. PATENT DOCUMENTS

| | | | | |
|---|---|---|---|---|
| 7,848,517 B2* | 12/2010 | Britz | ................... | H04L 63/0428 |
| | | | | 713/153 |
| 8,432,884 B1* | 4/2013 | Ashrafi | ..................... | H04L 5/04 |
| | | | | 370/343 |
| 8,599,893 B2* | 12/2013 | Kim | ...................... | G02F 1/3534 |
| | | | | 372/4 |
| 9,119,127 B1* | 8/2015 | Henry | ..................... | H04B 3/38 |

(Continued)

FOREIGN PATENT DOCUMENTS

| | | |
|---|---|---|
| CN | 113965443 A | 1/2022 |
| KR | 10-2021-0058312 A | 5/2021 |
| KR | 10-2022-0129827 A | 9/2022 |

OTHER PUBLICATIONS

Cisco, 5G Enterprise Radio Access Networks, 2021 (Year: 2021).*

(Continued)

*Primary Examiner* — Jai M Lee

(74) *Attorney, Agent, or Firm* — LRK PATENT LAW FIRM

(57) ABSTRACT

Disclosed are a radio access network (RAN) equipment and communication equipment for performing photonics-based terahertz wireless communication. The RAN equipment includes a radio unit (RU), a distributed unit (DU), and a central unit (CU), wherein the RU and the DU are configured to transmit and/or receive data through photonics-based terahertz wireless communication, and the DU and the CU are configured to transmit and/or receive data through photonics-based terahertz wireless communication.

13 Claims, 7 Drawing Sheets

500

Wireless midhaul          Wireless fronthaul

CU 510 — Tx / Rx — Rx / Tx — DU 520 — Tx / Rx — Rx / Tx — RU 530

(56) References Cited

U.S. PATENT DOCUMENTS

| | | | | |
|---|---|---|---|---|
| 9,136,421 | B2 * | 9/2015 | Moon | B82Y 20/00 |
| 10,243,657 | B1 * | 3/2019 | Atlas | H04B 10/25753 |
| 10,454,577 | B2 * | 10/2019 | Takahashi | H04B 10/118 |
| 10,805,021 | B2 * | 10/2020 | Sung | H04B 10/07953 |
| 10,903,906 | B2 * | 1/2021 | Ashrafi | H01Q 21/065 |
| 11,695,599 | B1 * | 7/2023 | Wang | H03M 3/424 |
| | | | | 455/562.1 |
| 11,716,145 | B2 * | 8/2023 | Chun | H04B 10/25753 |
| | | | | 398/115 |
| 11,799,553 | B2 * | 10/2023 | Kim | H04B 10/0797 |
| 11,923,910 | B1 * | 3/2024 | Rasmussen | H04B 10/556 |
| 12,231,166 | B2 * | 2/2025 | Steeves | H04B 10/25752 |
| 2006/0111047 | A1 * | 5/2006 | Louberg | H04W 92/20 |
| | | | | 455/73 |
| 2011/0149368 | A1 * | 6/2011 | Kim | G02F 1/3534 |
| | | | | 359/344 |
| 2011/0268085 | A1 * | 11/2011 | Barany | H04W 36/0033 |
| | | | | 370/331 |
| 2011/0293268 | A1 * | 12/2011 | Britz | H04B 10/90 |
| | | | | 398/202 |
| 2013/0156436 | A1 * | 6/2013 | Kim | H04B 10/90 |
| | | | | 398/115 |
| 2013/0320215 | A1 * | 12/2013 | Park | H04B 10/90 |
| | | | | 250/340 |
| 2021/0152251 | A1 * | 5/2021 | Moon | H04B 10/506 |
| 2022/0311591 | A1 * | 9/2022 | Sung | H04B 10/90 |
| 2023/0353243 | A1 * | 11/2023 | Puerta | H04B 10/25753 |
| 2023/0421261 | A1 * | 12/2023 | Yang | H04B 10/25758 |

OTHER PUBLICATIONS

Inside Towers, 5G Fiber-rich Networks, 2020 (Year: 2020).*
Yannik Horst et al., "Transparent Optical-THz-Optical Link Transmission over 5/115 m at 240/190 Gbit/s Enabled by Plasmonics", OFC 2021 © OSA 2021.
K Moon et al., "Terahertz Technology Based on Photonics", 2015 Electronics and Telecommunications Trends.

* cited by examiner

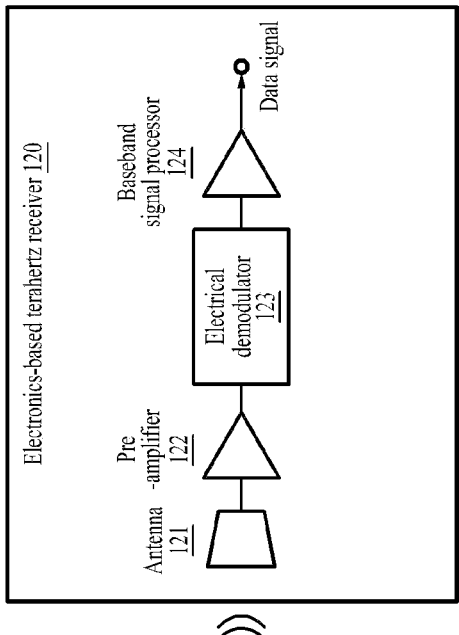
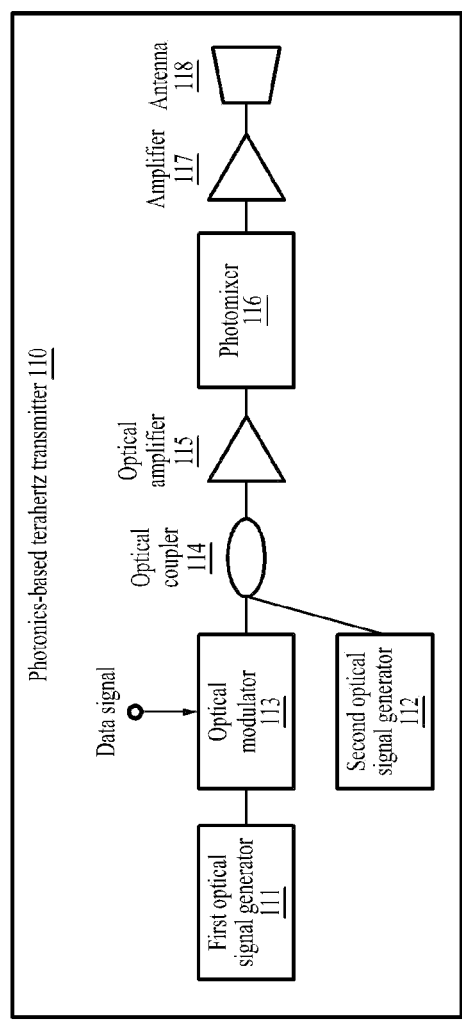
FIG. 1

400

| Pin | Logic | Symbol | Description |
|-----|-------|--------|-------------|
| 1 | | VeeT | Transmitter ground |
| 2 | LVTTL-O | Tx_Fault | Transmitter fault |
| 3 | LVTTL-I | Tx_Disable | Transmitter disable |
| 4 | LVTTL-I/O | SDA | 2 wire serial interface data line |
| 5 | LVTTL-I/O | SCL | 2 wire serial interface clock |
| 6 | | Mod_Abs | Module absent |
| 7 | LVTTL-I | TDD-CLK | Time division duplex clock |
| 8 | LVTTL-O | Rx_LOS | Receiver loss of signal |
| 9 | LVTTL-I | GPS-CLK | GPS clock |
| 10 | | VeeR | Receiver ground |
| 11 | | VeeR | Receiver ground |
| 12 | CML-O | RD- | Receiver inverted data output |
| 13 | CML-O | RD+ | Receiver data output |
| 14 | | VeeR | Receiver ground |
| 15 | | VccR | Receiver power supply |
| 16 | | VccT | Transmitter power supply |
| 17 | | VeeT | Transmitter ground |
| 18 | CML-I | TD+ | Transmitter data input |
| 19 | CML-I | TD- | Transmitter inverted data input |
| 20 | | VeeT | Transmitter ground |

RADIO ACCESS NETWORK (RAN) EQUIPMENT AND COMMUNICATION EQUIPMENT FOR PERFORMING PHOTONICS-BASED TERAHERTZ WIRELESS COMMUNICATION

CROSS-REFERENCE TO RELATED APPLICATION

This application claims the benefit of Korean Patent Application No. 10-2022-0159334 filed on Nov. 24, 2022, in the Korean Intellectual Property Office, the entire disclosure of which is incorporated herein by reference for all purposes.

BACKGROUND

1. Field of the Invention

One or more embodiments relate to a radio access network (RAN) equipment and communication equipment for performing photonics-based terahertz wireless communication.

2. Description of Related Art

In the field of communications, there may still be a terahertz band corresponding to an unexplored frequency band as a candidate frequency band that currently draws a lot of attention for the implementation of 6G mobile communication technology. However, the terahertz frequency band may have issues such as a high propagation loss in free space, high costs of implementation when an existing radio frequency (RF) electronic equipment is utilized, and low transmission performance. To resolve such issues, photonics-based terahertz communication technology using optical communication and optical component technology may be discussed as an alternative technology.

In many cases, a mobile fronthaul, midhaul, and backhaul are established using a wired optical network. If the cell radius is reduced to provide wideband services with 6G mobile communication technology in the future, more cells may be required, and supporting this may require the deployment and management of an optical communication network with more fronthaul, midhaul, and backhaul sections. Further, when a communication failure occurs in an existing optical communication network due to a disaster such as an earthquake, tsunami, landslide, or fire, a lot of time and money may be needed for restoration.

SUMMARY

Embodiments may provide a method and apparatus for easily configuring a wireless fronthaul, midhaul, and backhaul and a disaster recovery network using photonics-based terahertz wireless communication.

Embodiments may configure a wireless fronthaul, midhaul, and backhaul and a disaster recovery network using photonics-based terahertz wireless communication, without adding other electronic equipments, components, and network elements, thereby allowing communication service providers to implement communication infrastructures such as 6G mobile communication, beyond 6G (B6G) communication, and national communication networks without an additional burden of capital expenditure (CAPEX) and operating expense (OPEX).

According to an aspect, there is provided a radio access network (RAN) equipment including a radio unit (RU), a distributed unit (DU), and a central unit (CU), wherein the RU and the DU may be configured to transmit and/or receive data through photonics-based terahertz wireless communication link, and the DU and the CU may be configured to transmit and/or receive data through photonics-based terahertz wireless communication link.

The RU, the DU, and the CU may each include a photonics-based terahertz transmitter, and the photonics-based terahertz transmitter may include a first optical signal generator and a second optical signal generator each configured to generate light, an optical modulator configured to modulate the light generated by the first optical signal generator based on a data signal to be transmitted, an optical coupler configured to couple the light modulated by the optical modulator and the light generated by the second optical signal generator, an photomixer configured to generate an terahertz wave based on a signal coupled by the optical coupler, and an antenna configured to transmit the terahertz wave.

The terahertz wave may be generated based on a wavelength difference between the light generated by the first optical signal generator and the light generated by the second optical signal generator.

The RU, the DU, and the CU may each include a electronics-based terahertz receiver, and the electronics-based terahertz receiver may include an antenna configured to receive an terahertz wave transmitted from a photonics-based terahertz transmitter, an electrical demodulator configured to convert the terahertz wave received at the antenna into a baseband signal or an intermediate frequency carrier-based signal, and a baseband signal processor configured to restore a data signal from the baseband signal or the intermediate frequency carrier-based signal.

A photonics-based terahertz transmitter and/or an electronics-based terahertz receiver included in each of the RU, the DU, and the CU may include an interface including a time division duplexing (TDD) synchronization signal input/output terminal and a global positioning system (GPS) synchronization signal input/output terminal.

The DU and/or the CU may be configured to transmit and/or receive data to and/or from a router connected to a mobile core through photonics-based terahertz wireless communication link.

According to an aspect, there is provided an RAN equipment including a DU, and a CU, wherein the DU and/or the CU may be configured to transmit and/or receive data to and/or from a router connected to a mobile core through photonics-based terahertz wireless communication link.

The DU and the CU may each include a photonics-based terahertz transmitter, and the photonics-based terahertz transmitter may include a first optical signal generator and a second optical signal generator each configured to generate light, an optical modulator configured to modulate the light generated by the first optical signal generator based on a data signal to be transmitted, an optical coupler configured to couple the light modulated by the optical modulator and the light generated by the second optical signal generator, an photomixer configured to generate an terahertz wave based on a signal coupled by the optical coupler, and an antenna configured to transmit the terahertz wave.

The DU and the CU may each include a electronics-based terahertz receiver, and the electronics-based terahertz receiver may include an antenna configured to receive an terahertz wave transmitted from a photonics-based terahertz transmitter, an electrical demodulator configured to convert the terahertz wave received at the antenna into a baseband signal or an intermediate frequency carrier-based signal, and a baseband signal processor configured to restore a data signal from the baseband signal or the intermediate frequency carrier-based signal.

A photonics-based terahertz transmitter and/or an electronics-based terahertz receiver included in each of the DU and the CU may include an interface including a TDD synchronization signal input/output terminal and a GPS synchronization signal input/output terminal.

The RAN equipment may further include an RU, wherein the RU and the DU may be configured to transmit and/or receive data through photonics-based terahertz wireless communication link, and the DU and the CU may be configured to transmit and/or receive data through photonics-based terahertz wireless communication link.

According to an aspect, there is provided a communication equipment for performing communication with another communication equipment through a disaster recovery network, the communication equipment including an antenna, and a transceiver configured to transmit data to the other communication equipment or receive data from the other communication equipment based on photonics-based terahertz wireless communication link, through the antenna.

The transceiver may include a photonics-based terahertz transmitter, and the photonics-based terahertz transmitter may include a first optical signal generator and a second optical signal generator each configured to generate light, an optical modulator configured to modulate the light generated by the first optical signal generator based on a data signal to be transmitted, an optical coupler configured to couple the light modulated by the optical modulator and the light generated by the second optical signal generator, an photomixer configured to generate an terahertz wave based on a signal coupled by the optical coupler, and an antenna configured to transmit the terahertz wave.

The terahertz wave may be generated based on a wavelength difference between the light generated by the first optical signal generator and the light generated by the second optical signal generator.

The transceiver may include a electronics-based terahertz receiver, and the electronics-based terahertz receiver may include an antenna configured to receive an terahertz wave transmitted from a photonics-based terahertz transmitter, an electrical demodulator configured to convert the terahertz wave received at the antenna into a baseband signal or an intermediate frequency carrier-based signal, and a baseband signal processor configured to restore a data signal from the baseband signal or the intermediate frequency carrier-based signal.

The transceiver may include an interface including a TDD synchronization signal input/output terminal and a GPS synchronization signal input/output terminal.

Additional aspects of embodiments will be set forth in part in the description which follows and, in part, will be apparent from the description, or may be learned by practice of the disclosure.

According to embodiments, photonics-based terahertz wireless communication may be applied to the fields (e.g., a fronthaul, midhaul, backhaul, and a disaster recovery network) in which an existing photonics-based wired communication network is replaceable.

According to embodiments, by replacing a mobile fronthaul, midhaul, and backhaul established with a photonics-based wired communication network with a photonics-based terahertz wireless communication network, communication service providers may remarkably reduce CAPEX and OPEX through wireless infrastructure implementation without wired infrastructure establishment.

According to embodiments, by utilizing photonics-based terahertz wireless communication capable of transmitting a large volume of data, a disaster recovery network may be easily established without adding special costs to an existing network configuration or changing the physical configuration.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIGS. 1 and 2 are diagrams illustrating a transmitter and receiver for performing photonics-based terahertz wireless communication according to an embodiment;

FIGS. 3 and 4 are diagrams illustrating an optical transceiver according to an embodiment;

DETAILED DESCRIPTION

Figure 2:
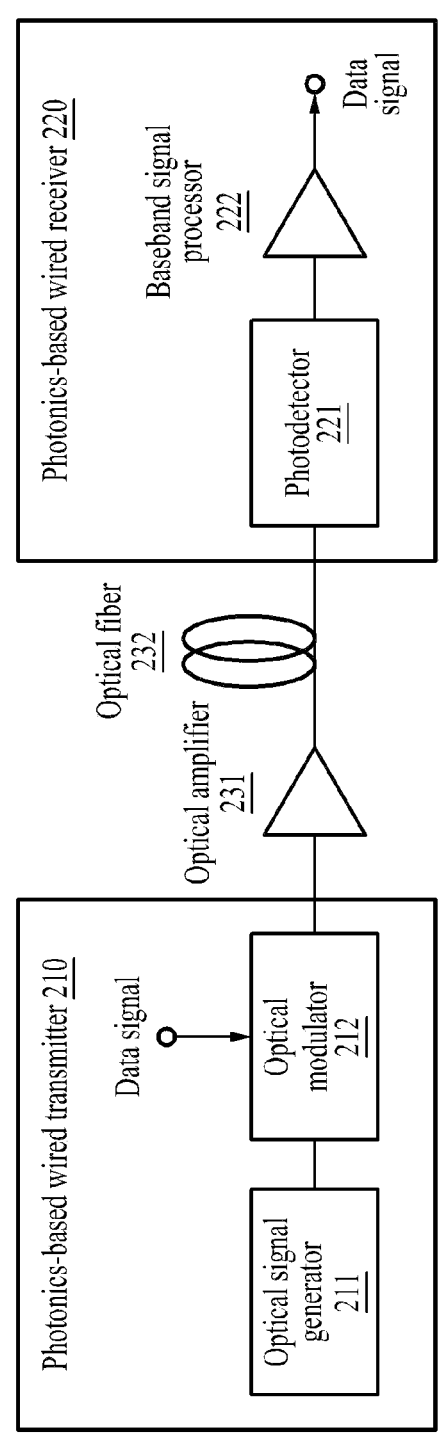

The following detailed structural or functional description is provided as an example only and various alterations and modifications may be made to the embodiments. Here, the embodiments are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly, the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a," "an," and "the" are intended to include the plural forms as well, unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. It will be further understood that the terms "comprises/including" and/or "includes/including" when used herein, specify the presence of stated features, integers, operations, operations, elements, and/or components, but do not preclude the presence or addition of one or more other features, integers, operations, operations, elements, components and/or groups thereof.

Unless otherwise defined, all terms, including technical and scientific terms, used herein have the same meaning as commonly understood by those having ordinary skill in the art to which this disclosure pertains. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like components and a repeated description related thereto will be omitted.

FIGS. 1 and 2 are diagrams illustrating a transmitter and receiver for performing photonics-based terahertz wireless communication according to an embodiment.

Referring to FIG. 1, a transmitter 110 and receiver 120 for performing photonics-based terahertz wireless communication are shown.

The transmitter 110 for performing photonics-based terahertz wireless communication may include a first optical signal generator 111, a second optical signal generator 112, an optical modulator 113, an optical coupler 114, an optical amplifier 115, an photomixer 116, an amplifier 117 in a terahertz band, and an antenna 118.

An optical signal generator may include, in general, two laser diodes to generate a terahertz wave. The first optical signal generator 111, which is one of the two laser diodes, may provide a continuous wave (CW) output, and light from the first optical signal generator 111 may be modulated based on a data signal by the optical modulator 113 (e.g., an electro-optic modulator (EOM) or an electro-absorption modulator (EAM)) connected to an output terminal of the first optical signal generator 111. The data signal may be a data signal to be transmitted to the receiver 120. The second optical signal generator 112, which is one of the two laser diodes, may generate an optical signal for an optical local oscillator having a CW characteristic, the optical signal operating as a beating signal in the photomixer 116. Two lights generated by the first and second optical signal generators 111 and 112 may be coupled by the optical coupler 114, and a signal obtained by coupling the two lights may be amplified through the optical amplifier 115 (e.g., an erbium-doped fiber amplifier (EDFA) or a semiconductor optical amplifier (SOA)), and then, an terahertz wave corresponding to a wavelength difference between the two lights may be generated by the photomixer 116 (e.g., a photodiode, a photoconductor) according to the optical heterodyne mixing principle. At this time, the frequency of the terahertz wave obtained through opto-electric conversion may be determined to be the wavelength difference between the two lights described above. For example, when the light generated by the first optical signal generator 111 has a wavelength fixed to 1550.12 nanometers (nm) and the light generated by the second optical signal generator 112 has a wavelength fixed to 1552.52 nm, the frequency of the terahertz wave obtained by the photomixer 116 through opto-electric conversion may be 2.4 nm to 300 gigahertz (GHz). To compensate for a high propagation loss in free space before radiated into the air, the terahertz wave output from the photomixer 116 may pass through the amplifier 117 (e.g., a power amplifier) and then be propagated into the air through the antenna 118.

The receiver 120 for performing photonics-based terahertz wireless communication may include an antenna 121, a pre-amplifier 122, an electrical demodulator 123, and a baseband signal processor (e.g., a baseband integrated circuit (IC)) 124 including an amplification function.

The terahertz wave output from the transmitter 110 may travel a predetermined wireless transmission distance and be injected into the antenna 121 of the receiver 120. The terahertz wave received at the antenna 121 may pass through the pre-amplifier 122 (e.g., a low-noise amplifier) for loss compensation and then, be converted into a baseband signal or a signal having an intermediate frequency carrier by the electrical demodulator 123 (e.g., a Schottky barrier diode and mixer or a diode detector). When the output of the electrical demodulator 123 is converted into a baseband signal, the baseband signal may be restored to the data signal transmitted by the transmitter 110 while passing through the baseband signal processor 124 including an amplification function. Alternatively, when the output of the electrical demodulator 123 is converted into a signal having an intermediate frequency carrier, the signal having the intermediate frequency carrier may undergo frequency down-conversion again into a baseband signal by the baseband signal processor 124 and then be restored to the data signal.

Referring to FIG. 2, a photonics-based wired transmitter 210 and receiver 220 used in a photonics-based wired communication network are shown.

The transmitter 210 may include an optical signal generator 211 and an optical modulator 212. Light output from the optical signal generator 211 (e.g., a laser diode) may be modulated into an electrical data signal by the optical modulator 113, then pass through the optical amplifier 115 to compensate for a loss occurring in optical fiber transmission, and then be transmitted to the receiver 220 through an optical fiber 232.

The receiver 220 may include an photodetector 221 and a baseband signal processor 222. The signal transmitted through the optical fiber 232 may undergo opto-electric conversion through the photodetector 221 (e.g., a photo-diode), and then, the converted electrical signal may be restored to the data signal transmitted by the transmitter 210 while passing through the baseband signal processor 222 including an amplification function.

The photonics-based wired transmitter 210 and receiver 220 described above may be considerably similar to the transmitter 110 and receiver 120 for performing photonics-based terahertz wireless communication described with reference to FIG. 1. The transmitter 110 and receiver 120 for performing photonics-based terahertz wireless communication may further require some components used for wireless communication, but such components may be very similar to the basic components (e.g., the optical signal generator 211, the optical modulator 212, an optical amplifier 231, and the photodetector 221 of FIG. 2) int terms of transmission method.

As above, the photonics-based wired transmitter 210 and receiver 220 are considerably similar to the transmitter 110 and receiver 120 for performing photonics-based terahertz wireless communication described with reference to FIG. 1, and thus, the photonics-based wired communication network may be easily replaced with the transmitter 110 and receiver 120 for performing photonics-based terahertz wireless communication. However, there may be a difference in that the photonics-based wired communication network uses the optical fiber 232 (e.g., an optical cable) as the main transmission medium whereas the photonics-based terahertz wireless communication network uses free space as the main transmission medium. Further, there may be a difference in that the transmitter 110 and receiver 120 for performing photonics-based terahertz wireless communication additionally include transmission and reception antennas for propagation in free space. With such structural similarity, the transmitter 110 and receiver 120 for performing photonics-based terahertz wireless communication may be applied to predetermined application fields such as a mobile fronthaul, midhaul, or backhaul and disaster recovery network built as a photonics-based wired communication network.

Figure 3:
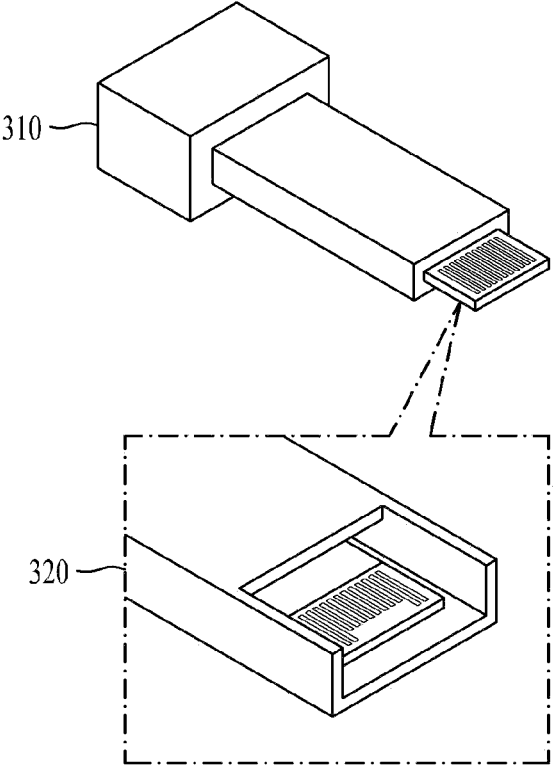

FIGS. 3 and 4 are diagrams illustrating an optical transceiver according to an embodiment.

Referring to FIG. 3, a photonics-based terahertz wireless transceiver 310 and an interface 320 are shown. The transceiver 310 may be the transmitter 110 and receiver 120 for performing photonics-based terahertz wireless communication of FIG. 1.

The transceiver 310 may be a multi-source agreement (MSA) compatible optical transceiver, and may be, for example, a small form pluggable (SFP), small form-factor pluggable plus (SFP+), 10-gigabit small form factor pluggable (XFP), compact small form-factor pluggable (CSFP), quad small form-factor pluggable 40 G (QSFP), gigabit interface converter (GBIC), fiber optic transceiver for 10 Gb ethernet (XENPAK), fiber optic transceiver for 10 Gb ethernet (X2), 400 form-factor pluggable (CDFP), micro quad small form-factor pluggable (micro QSFP), C form-factor pluggable (CFP), small form-factor pluggable 28 (SFP28), quad small form-factor pluggable 28 (QSFP28), quad small form-factor pluggable double density (QSFP-DD), or octal small form factor pluggable (OSFP)-type optical transceiver. The shape and interface of such an optical transceiver may comply with the standards established by a de facto standards organization, called a multi-source agreement (MSA). Many optical transceivers for wired communication are manufactured according to the standards established by the MSA and thus, may operate with no problem at all when matched with an optical transmission system including a fronthaul and a backhaul. If such an electrical interface is applied to manufacture the photonics-based terahertz wireless transceiver 310, the photonics-based terahertz wireless transceiver 310 may normally operate without the existing fronthaul, midhaul, and backhaul and a separate electrical interface conversion equipment. In other words, a wired fronthaul, midhaul, and backhaul system may be easily and cost-efficiently changed to a photonics-based terahertz wireless fronthaul, midhaul, and backhaul system. However, compared to an optical transceiver, the components in the photonics-based terahertz wireless transceiver 310 may further include some additional optical components or electronic components, and thus, its physical size and shape may partially change.

Referring to FIG. 4, standards 400 for a 20-pin electrical interface 320 of the photonics-based terahertz wireless transceiver 310 of FIG. 3 are shown. According to the 20-pin electrical interface standards of the optical transceiver, there are two pins 410 yet to be defined, and the two pins 410 may be utilized as a time division duplexing (TDD) synchronization signal input/output port and a global positioning system (GPS) synchronization signal input/output port required for wireless communication. As above, the definitions and standards of the 20 pins of the photonics-based terahertz wireless transceiver in the case of using the two pins 410 as an interface for transmitting two synchronization signals may be exemplarily shown in FIG. 4.

Figure 5:
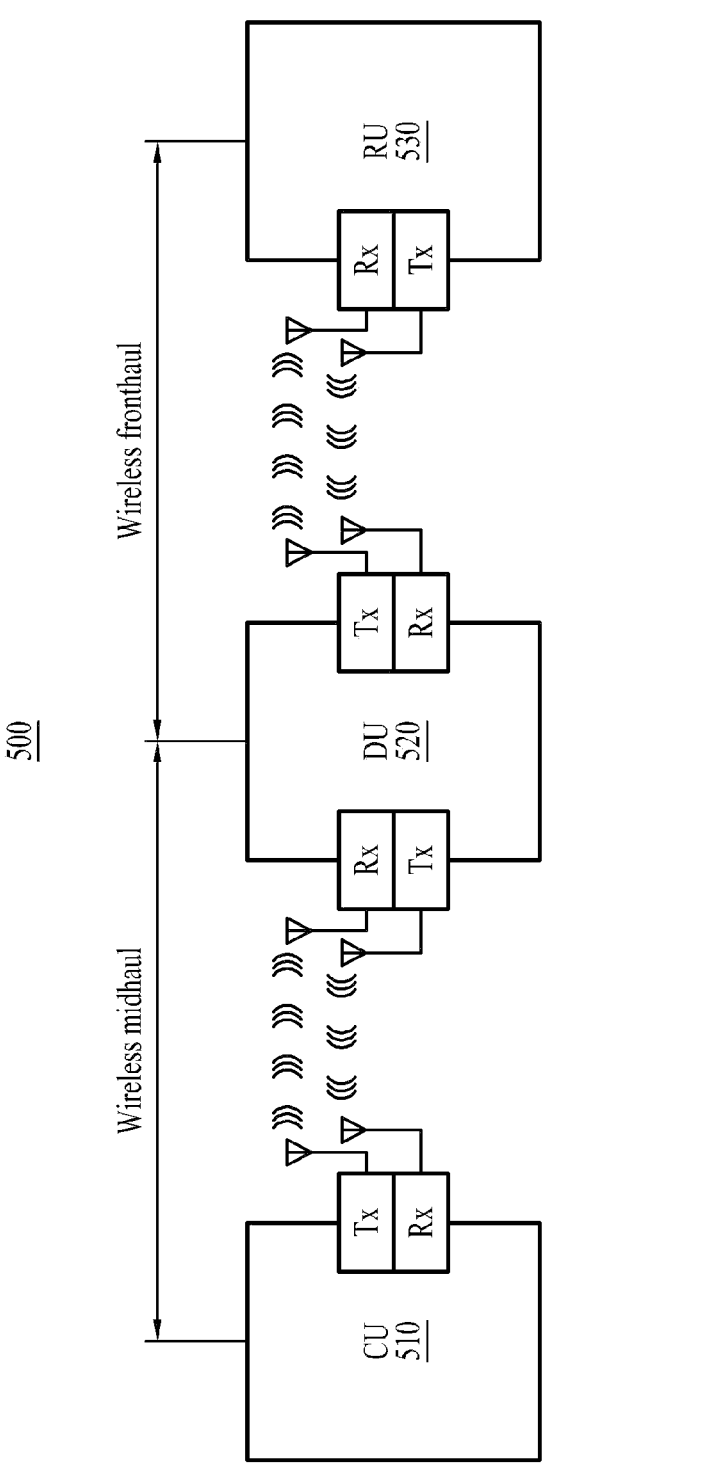
FIG. 5 is a diagram illustrating a midhaul and fronthaul based on photonics-based terahertz wireless communication according to an embodiment.

FIG. 5 is a diagram illustrating a midhaul and fronthaul based on photonics-based terahertz wireless communication according to an embodiment.

Referring to FIG. 5, a central unit (CU) 510, a distributed unit (DU) 520, and a radio unit (RU) 530 included in a radio access network (RAN) equipment 500 are shown. The RAN equipment 500 shows an example of applying photonics-based terahertz wireless communication technology to a midhaul and fronthaul corresponding to a photonics-based wired communication network.

In the case of a photonics-based wired midhaul and fronthaul, a midhaul between the CU and the DU and a fronthaul between the DU and the RU may both be connected with optical fibers. A midhaul and fronthaul may be configured in such a structure in the current 5G network, but the future 6G network may need to further reduce the mobile communication cell radius to provide ultra-wideband, ultra-low latency, and ultra-realistic services to users, which may lead to a further increase in the number of midhauls and fronthauls to be established by communications service providers. Implementation of such midhaul and fronthaul as a photonics-based wired communication network may require more optical fiber infrastructure, which may significantly increase the costs of establishment for communications service providers. Further, an issue may arise in providing 6G services in areas where it is not easy to establish optical infrastructures. These issues may be solved by easily implementing a wireless midhaul and a wireless fronthaul without additional establishment of optical fiber infrastructures when an optical transceiver for wired communication is changed to a photonics-based terahertz transceiver, as shown in FIG. 5. Furthermore, wireless infrastructures may be easily implemented with antennas included in the photonics-based terahertz transceiver, and thus, the network establishment costs may be considerably lowered, and the network management costs may be effectively reduced, compared to a photonics-based wired communication network.

Figure 6:
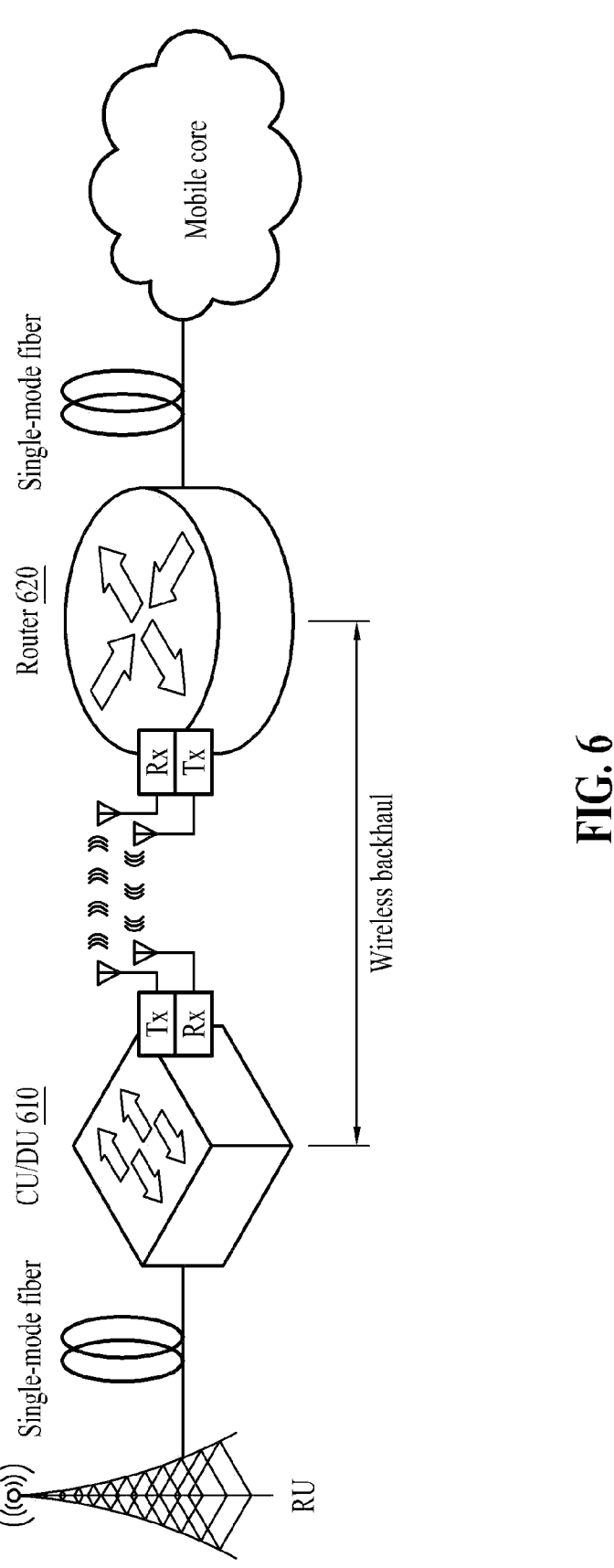
FIG. 6 is a diagram illustrating a backhaul based on photonics-based terahertz wireless communication according to an embodiment.

FIG. 6 is a diagram illustrating a backhaul based on photonics-based terahertz wireless communication according to an embodiment.

Referring to FIG. 6, an example of implementing a backhaul between a CU or DU 610 and a router 620 with photonics-based terahertz wireless communication is shown. Similar to the description of FIG. 5, a backhaul corresponding to a photonics-based wired communication network is implemented through an optical transceiver for wired communication and an optical fiber such that traffic is mutually passed between two network components, but may include the limitation of the photonics-based wired communication network as in the case of the midhaul and fronthaul described above. As shown in FIG. 6, a wireless backhaul may be easily implemented without additional establishment of optical fiber infrastructures when an optical transceiver for wired communication is changed to a photonics-based terahertz transceiver.

Figure 7:
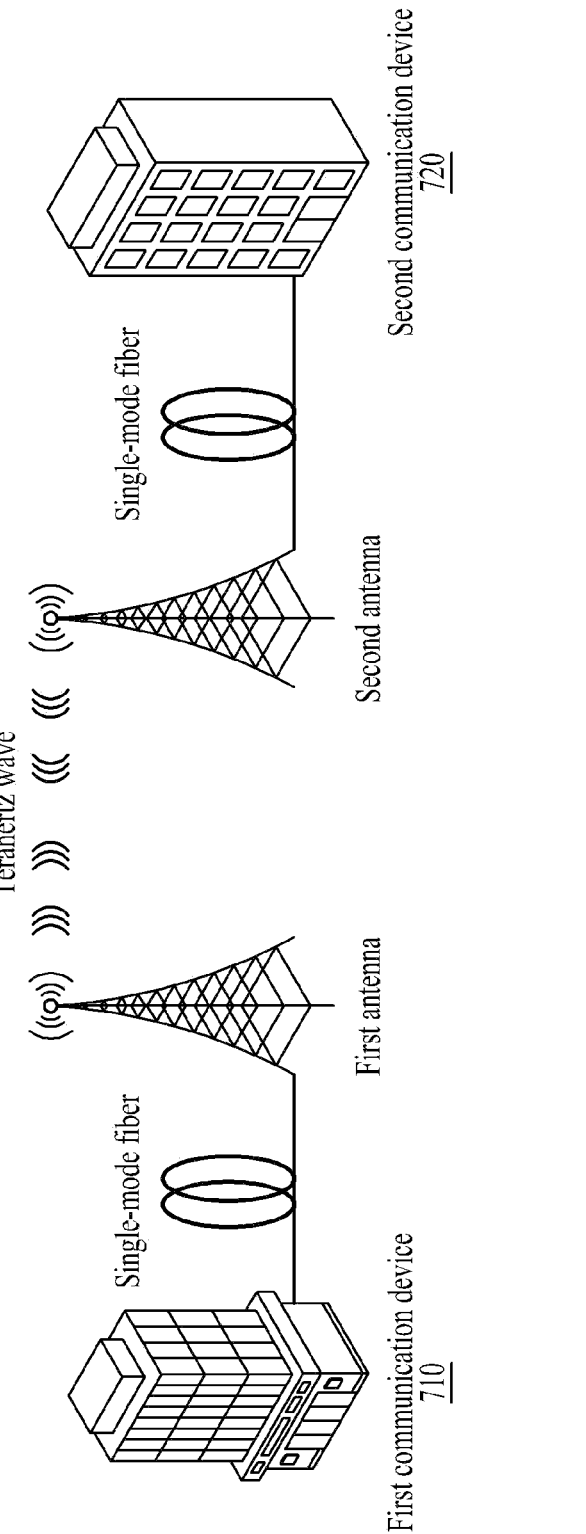
FIG. 7 is a diagram illustrating a disaster recovery network based on photonics-based terahertz wireless communication according to an embodiment.

FIG. 7 is a diagram illustrating a disaster recovery network based on photonics-based terahertz wireless communication according to an embodiment Referring to FIG. 7, a first communication equipment 710 and a second communication equipment 720 connected via a disaster recovery network are shown. When the first communication equipment 710 and the second communication equipment 720 are connected via a photonics-based wired communication network, optical fibers may be cut due to a disaster such as a fire, earthquake, tsunami, or war. In this case, all wideband traffic transmitted through the wired network may not be transferred, resulting in a large-scale communication outage. To solve this, a lot of time and money needs to be invested to restore the wired network. However, when a photonics-based terahertz wireless communication network is utilized, the communication network may be easily restored in a short time and at a low cost. As shown in FIG. 7, the first communication equipment 710 and the second communication equipment 720 may resume communication through the disaster recovery network based on a photonics-based terahertz transceiver.

The components described in the embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The embodiments described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or collectively instruct or configure the processing device to operate as desired. Software and data may be stored in any type of machine, component, physical or virtual equipment, or computer storage medium or device capable of providing instructions or data to or being interpreted by the processing device. The software may also be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described embodiments, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A radio access network (RAN) equipment comprising:
a radio unit (RU);
a distributed unit (DU); and
a central unit (CU),
wherein the RU and the DU are configured to transmit and/or receive data through photonics-based terahertz wireless communication, and
the DU and the CU are configured to transmit and/or receive data through photonics-based terahertz wireless communication, and
a photonics-based terahertz transmitter and/or receiver included in each of the RU, the DU, and the CU comprises an interface comprising a time division duplexing (TDD) synchronization signal input/output terminal and a global positioning system (GPS) synchronization signal input/output terminal.

2. The RAN equipment of claim 1, wherein
the RU, the DU, and the CU each comprise a photonics-based terahertz transmitter, and
the photonics-based terahertz transmitter comprises:
a first optical signal generator and a second optical signal generator each configured to generate light;
an optical modulator configured to modulate the light generated by the first optical signal generator based on a data signal to be transmitted;
an optical coupler configured to couple the light modulated by the optical modulator and the light generated by the second optical signal generator;
a photomixer configured to generate an terahertz wave based on a signal coupled by the optical coupler; and
an antenna configured to transmit the terahertz wave.

3. The RAN equipment of claim 2, wherein the terahertz wave is generated based on a wavelength difference between the light generated by the first optical signal generator and the light generated by the second optical signal generator.

4. The RAN equipment of claim 1, wherein
the RU, the DU, and the CU each comprise a electronics-based terahertz receiver, and
the electronics-based terahertz receiver comprises:
an antenna configured to receive an terahertz wave transmitted from a photonics-based terahertz transmitter;
an electrical demodulator configured to convert the terahertz wave received at the antenna into a baseband signal or an intermediate frequency carrier-based signal; and a baseband signal processor configured to restore a data signal from the baseband signal or the intermediate frequency carrier-based signal.

5. The RAN equipment of claim 1, wherein the DU and/or the CU is configured to transmit and/or receive data to and/or from a router connected to a mobile core through photonics-based terahertz wireless communication.

6. A radio access network (RAN) equipment comprising:
a distributed unit (DU); and
a central unit (CU),
wherein the DU and/or the CU is configured to transmit and/or receive data to and/or from a router connected to a mobile core through photonics-based terahertz wireless communication, and
wherein a photonics-based terahertz transmitter and/or receiver included in each of the DU and the CU comprises an interface comprising a time division duplexing (TDD) synchronization signal input/output terminal and a global positioning system (GPS) synchronization signal input/output terminal.

7. The RAN equipment of claim 6, wherein
the DU and the CU each comprise a photonics-based terahertz transmitter, and
the photonics-based terahertz transmitter comprises:
a first optical signal generator and a second optical signal generator each configured to generate light;
an optical modulator configured to modulate the light generated by the first optical signal generator based on a data signal to be transmitted;
an optical coupler configured to couple the light modulated by the optical modulator and the light generated by the second optical signal generator;
a photomixer configured to generate an terahertz wave based on a signal coupled by the optical coupler; and
an antenna configured to transmit the terahertz wave.

8. The RAN equipment of claim 6, wherein
the DU and the CU each comprise a electronics-based terahertz receiver, and
the electronics-based terahertz receiver comprises:
an antenna configured to receive an terahertz wave transmitted from a photonics-based terahertz transmitter;
an electrical demodulator configured to convert the terahertz wave received at the antenna into a baseband signal or an intermediate frequency carrier-based signal; and
a baseband signal processor configured to restore a data signal from the baseband signal or the intermediate frequency carrier-based signal.

9. The RAN equipment of claim 6, further comprising:
a radio unit (RU),
wherein the RU and the DU are configured to transmit and/or receive data through photonics-based terahertz wireless communication, and the DU and the CU are configured to transmit and/or receive data through photonics-based terahertz wireless communication.

10. A communication equipment for performing communication with another communication equipment through a disaster recovery network, the communication equipment comprising:
an antenna; and
a transceiver configured to transmit data to the other communication equipment or receive data from the other communication equipment based on photonics-based terahertz wireless communication, through the antenna,
wherein the transceiver comprises an interface comprising a time division duplexing (TDD) synchronization signal input/output terminal and a global positioning system (GPS) synchronization signal input/output terminal.

11. The communication equipment of claim 10, wherein
the transceiver comprises a photonics-based terahertz transmitter, and
the photonics-based terahertz transmitter comprises:
a first optical signal generator and a second optical signal generator each configured to generate light;
an optical modulator configured to modulate the light generated by the first optical signal generator based on a data signal to be transmitted;
an optical coupler configured to couple the light modulated by the optical modulator and the light generated by the second optical signal generator; and
a photomixer configured to generate an terahertz wave based on a signal coupled by the optical coupler,
wherein the antenna is configured to transmit the terahertz wave.

12. The communication equipment of claim 11, wherein the terahertz wave is generated based on a wavelength difference between the light generated by the first optical signal generator and the light generated by the second optical signal generator.

13. The communication equipment of claim 10, wherein
the transceiver comprises a electronics-based terahertz receiver, and
an antenna configured to receive an terahertz wave transmitted from a photonics-based terahertz transmitter, and
the electronics-based terahertz receiver comprises:
an electrical demodulator configured to convert the terahertz wave received at the antenna into a baseband signal or an intermediate frequency carrier-based signal; and
a baseband signal processor configured to restore a data signal from the baseband signal or the intermediate frequency carrier-based signal.

* * * * *